Jan. 22, 1957   T. A. ST. CLAIR ET AL   2,778,720
GAS CARBURETOR SYSTEM
Filed May 25, 1951
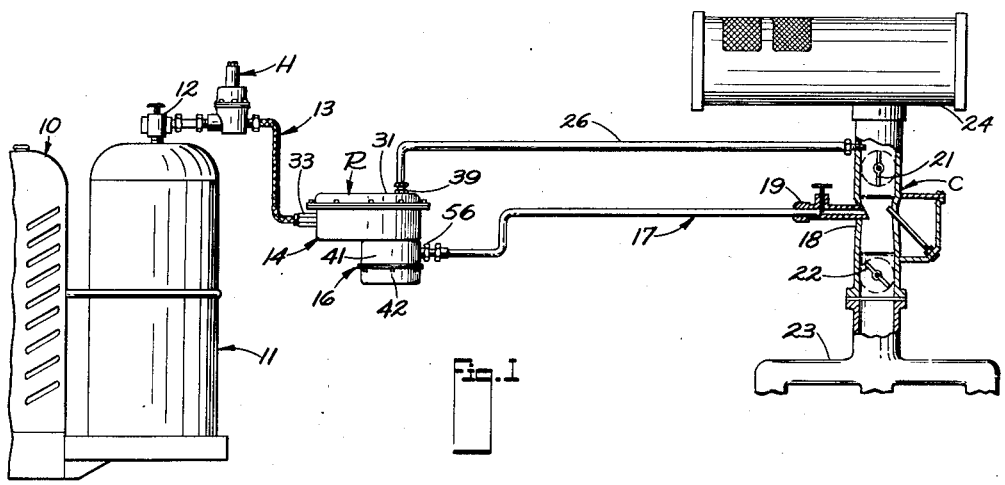
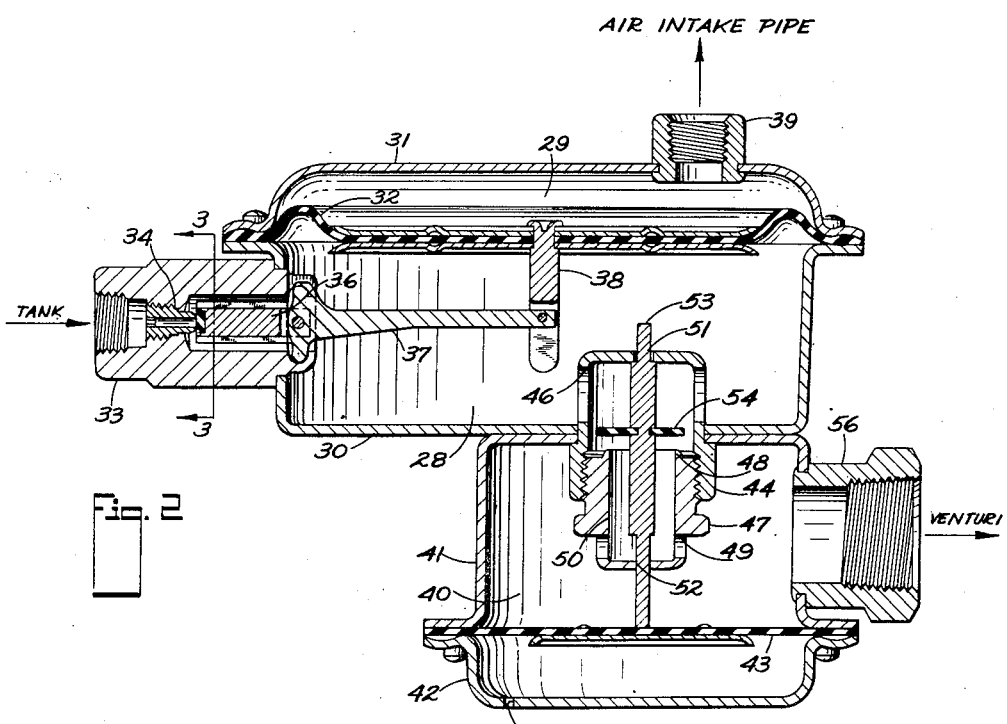
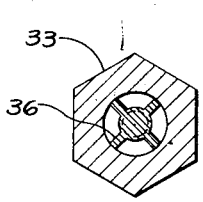
INVENTORS
THEODORE A. ST. CLAIR
& OWEN L. GARRETSON
BY Richey & Watts
ATTORNEYS the
United States Patent Office 2,778,720
Patented Jan. 22, 1957

2,778,720
GAS CARBURETOR SYSTEM

Theodore A. St. Clair, Cleveland, Ohio, and Owen L. Garretson, Roswell, N. Mex., assignors to The Weatherhead Company, Cleveland, Ohio, a corporation of Ohio Application May 25, 1951, Serial No. 228,314

2 Claims. (Cl. 48—184)

This invention relates to gas pressure regulation and control.

The principal object of this invention is to lock off and seal a supply of gas under pressure when no gas is being consumed, and at the same time to provide a regulated flow of gas proportional to demand, as reflected by a pressure drop in the delivery line with respect to a reference pressure, including pressure drops less than the pressure differential required to be maintained to hold the gas sealed off when it is not being consumed.

Other objects are to combine with a pressure regulator a lock-off valve in the outlet of the regulator which is normally closed when the pressure at the point of delivery is equal to a reference pressure, and which opens when a pressure drop exists at the delivery point with respect to such reference pressure, including a pressure drop less than the pressure differential required to maintain the regulator sealed; and to combine with such a lock-off valve a regulator so biased as not to remain sealed, or biased slightly open, when the pressure in the outlet chamber of the regulator is equal to the reference pressure.

Another object of this invention is to increase the sensitivity of a regulating system while maintaining the desired relation of flow to demand by using different reference pressures on a lock-off valve or regulator and a flow controlling regulator.

A further object is to regulate and control the delivery of fuel to a combustion engine in accordance with the pressure drop at a venturi in the air supply for the engine in such a manner as positively to seal off the fuel line when the engine is not operating, and to supply the desired regulated volume of fuel at all operating and idling speeds of the engine.

The manner in which these and other objects may be accomplished will be apparent in the following detailed description of the preferred embodiment of the invention.

In the drawings:

Fig. 1 is a schematic diagram of an installation embodying the invention;

Fig. 2 is a section through a regulator incorporating the automatic shut-off valve; and, Fig. 3 is a section taken on 3—3 of Fig. 2.

Fig. 1 shows an installation embodying the invention applied to a liquefied petroleum gas fuel system for an internal combustion engine. For example, a tractor or other vehicle 10 has mounted thereon a tank 11 of such gas maintained in liquid phase under pressure. The tank is connected through a main shut-off valve 12 with a high pressure regulator H. In a typical installation, the high pressure regulator reduces the pressure of the liquefield petroleum gas from a pressure of about 100 p. s. i. to a pressure of about 5 to 15 p. s. i. The high pressure regulator connects, by means of line 13, to the combined low pressure regulator and cut-off unit R which serves to reduce the gas pressure substantially to atmospheric pressure. Regulator R is (in the form of the invention shown) a dual purpose device in that it includes a pressure-regulating or reducing section 14 and a diaphragm-controlled cut-off valve section 16. The outlet of the regulator cut-off unit is connected by means of line 17 to the venturi 18 of the engine induction pipe C. An adjustable metering valve 19 is provided to control the fuel supply and determine the ratio of fuel to air entering the engine. The outlet from the valve 19, being disposed in the carburetor venturi, is between the choke valve 21 and the throttle valve 22 that controls flow of fuel and air to the intake manifold 23 of the engine. It is customary to connect an air-cleaner 24 to the inlet of the induction pipe which creates a pressure drop as the incoming air flows therethrough. In order that the pressure differential serving to actuate the regulator R be a true function of the flow through the carburetor venturi, uneffected by the pressure drop occurring in the air-cleaner, a balancing line 26 is connected between the regulator and the engine intake pipe, so that the reference pressure for the regulator 14 is the pressure entering the venturi 18.

The construction of the preferred form of a regulator embodying the automatic cut-off valve appears in Figs. 2 and 3. The regulator has a regulating chamber 28 and an atmosphere chamber 29 formed by a sheet metal housing with a lower portion 30 and an upper portion 31 clamped together by suitable fastenings against a diaphragm 32. An inlet nipple 33 is brazed to the lower housing member and incorporates a valve seat member 34. A movable valve member 36 is slidably mounted in the nipple and pinned to a bell crank lever 37 for opening and closing the valve. A post 38 is connected to the diaphragm 32 and pinned to lever 37, thereby providing a pressure responsive valve. No spring bias for the valve is incorporated in the regulator in its preferred form which is designed for mounting with its diaphragms horizontally, the parts being so designed that the weight of the diaphragm and the members connected thereto is such as to bias the valve slightly toward open position and pressure in the lower chamber 28 tends to close the valve. A nipple 39 is brazed to the upper housing 31 forming a duct for connection to the balancing line 26.

The cut-off valve assembly has a control chamber 40 formed by an upper housing 41 brazed to the main regulator casing 30 and a lower housing 42, there being a diaphragm 43 clamped between the housings. A fitting 44 is brazed in place and formed with inlet ports 46. An apertured nut 47 is threaded into the fitting and has a valve seat 48 formed therein to provide a valve assembly. Ports 49 formed in the wall of the nut 47 and the bore 50 therein provide a passageway for fluid communication between the chambers 28 and 40. Members 44 and 47 have aligned apertures 51 and 52, respectively, which receive a sliding pin 53 upon which is mounted a lightweight valve disk 54 preferably formed of extremely soft rubber of the like. An outlet nipple 56 is brazed to the housing 41 and forms part of the fuel delivery conduit leading to the engine. In the preferred embodiment of the invention the shut-off valve is referenced to atmospheric pressure through aperture 57 in the casing 42, instead of the pressure at the entrance to the venturi 18 to which the regulator 14 is referenced by the balance line 26.

In operation, the regulator valve R receives gaseous fuel at a pressure of about 5 p. s. i. from the fuel supply through inlet nipple 33. The flow of the fuel into chamber 28 is regulated by the position of the movable valve member 36 relative to the seat member 34. The position of the valve member 36 is determined by the relative differential pressure of the gas in the regulating chamber 28 and atmospheric chamber 29. When the upward force on the diaphragm 32, produced by this differential pressure, exceeds the weight of the diaphragm parts, the valve member 36 is moved toward the seat member 34 and the pressure in the chamber 28 is reduced. When the pressure differential falls below a point which will support the diaphragm parts, the valve member 36 is actuated away from the seat member 34 by bell crank 37 and the downward motion of the diaphragm 32, thus allowing gas to enter the chamber 28 and return the pressure to normal. Since chamber 29 is referenced to the induction pipe C between the choke valve 21 and the air-cleaner 24, the fuel supply pressure in the regulating chamber 28 is held at a constant level slightly above the pressure in the induction pipe C immediately upstream from the choke valve 21 and venturi 18.

The cut-off valve unit 16 is interposed in the flow path of the fuel from the regulator chamber 28 to the induction pipe C. The cut-off valve is normally closed to prevent the discharge of fuel into the manifold 23 when the engine is not in operation. The weight of the cut-off valve assembly is sufficient to bias the valve disk 54 against seat 48. The engagement of the resilient valve disk 54 with the seat 48 seals off the fuel passage and renders impossible the discharge of fuel from the regulator chamber 28 while the engine is not running.

The valve disk 54 is preferably made of extremely soft rubber or similar material so that it is deformed into sealing relation with its seat 48 by a very slight bias or pressure differential. In order to attain such sealing under extremely light pressures, the disk may be so constructed as to be incapable of withstanding the pressure delivered by the conduit 13 to the inlet nipple 33 of the regulator 14. This is possible because only a slight pressure rise is required in the chamber 28 to lock off the gas flow by the valve member 36 against the seat member 34. Thus in the preferred form the valve disk 54 is capable of sealing under a very small bias and serves to trap sufficient pressure in the chamber 28 to insure a seal by the valve 36.

Sufficient fuel flow for starting the engine may be obtained at any cranking speed, even with a relatively insensitive regulating system by partially closing the choke valve 21, which produces a substantial pressure drop in the supply line 17 and opens the valve 54 and the valve 36. When the engine is running, however, it is necessary to supply automatically the correct amount of fuel at all speeds, including very low idling speeds. The flow of air through the venturi 18 in the intake conduit C produces a pressure drop with respect to the pressure of the air entering the venturi which varies with the speed of flow. The flow resistance through the intake piping and the air-cleaner 24 produces a further pressure drop of the air entering the venturi with respect to atmosphere. The total depression so produced is transmitted through the pipe 17 to the chamber 40. The underside of the diaphragm being subjected to a reference pressure, atmospheric pressure in the embodiment disclosed, a pressure differential is created on the diaphragm which, at minimum operating speeds of the engine, lifts the valve 54 from its seat and admits fuel from the chamber 28 to the conduit 17 and thence to the venturi 18 where it is mixed with air and delivered to the engine. Any reduction in the pressure trapped in the chamber 28 with respect to the reference pressure in the chamber 29 upon initial opening of the valve 54 causes the diaphragm 32 to move downwardly, thereby opening the valve 36 and admitting sufficient gas from the line 13 to restore a pressure differential across the diaphragm 32 sufficient to hold the valve 36 closed. At extremely low rates of flow, such as occur at minimum idling speeds of the engine in the disclosed embodiment, the regulator 14 acts as a first stage regulator to maintain a pressure slightly above the reference pressure in the chambr 29 and the flow is governed by the valve 54 controlled by the diaphragm 43. If the reference pressures on the diaphragms 32 and 43 are the same, as for example, if the chamber 29 is simply open to atmosphere instead of being connected to the balance line 26 this operation continues with increasing flow until the flow reaches a rate at which the pressure drop between the chambers 28 and 40 exceeds the difference between the normally maintained pressure in the chamber 28 and the reference pressure on the diaphragm 43, at which point the valve 54 simply moves and remains fully opened and the flow is governed by the valve 36, controlled by the diaphragm 32.

In the preferred arrangement disclosed, however, the reference pressure in the chamber 29 is less than atmospheric by an amount equal to the pressure drop in the air moving through the air-cleaner 24 and the intake conduit to the entrance of the venturi 18, whereas, the diaphragm 43 is referenced to atmospheric pressure. This arrangement gives a further advantage in that the sensitivity of the valve 54, at very low flows, is increased whereas through the greater part of the range of flows the pressure and, therefore, the volume of fuel delivered is governed by the diaphragm 32 in accordance with the pressure drop between the entrance and the throat of the venturi 18 so that the amount of fuel delivered at different speeds of operation is not affected by the pressure drop through the air-cleaner.

The metering valve 19 is adjustable to obtain a predetermined fuel-air ratio since the pressure in the venturi throat relative to the upstream pressure is a function of the flow of air through the throat. The utilization of this same pressure differential to force fuel through the metering valve will thereby determine the proper amount of fuel at any air flow condition.

With this particular arrangement of diaphragms and valves, a positive control is obtained of the fuel flow from the pressurized source to the engine which control is extremely sensitive to small changes in pressure, thereby rendering it effective to open immediately upon starting the engine, and at the same time to close tightly and seal when the engine operation is terminated.

Having completed a detailed description of a preferred embodiment of the present invention so that others skilled in the art may be able to understand and practice the same, we state that what we desire to secure by Letters Patent is not limited by said preferred embodiment but rather is defined in what is claimed.

What is claimed is:

1. A fuel system for a combustion engine having an air intake conduit provided with a flow restriction and a venturi downstream from said flow restriction, a source of fuel under pressure, a regulating system connecting said source to the throat of said venturi, said regulating system including a differential pressure regulator comprising a regulating chamber having an inlet and an outlet and being adapted to control the flow of fuel from said source, said regulator being referenced to said intake conduit between said restriction and said venturi, a cutoff valve chamber, a tube connecting the outlet of said regulating chamber to said cutoff chamber, a valve seat in said tube, a cutoff valve having a stem and a resilient head member, one face of said head member adapted to engage said valve seat to close said tube and isolate said regulating chamber from said venturi, said one face of said valve head being exposed to the pressure in said venturi, the opposite face of said valve head being exposed by means of said tube to the pressure in said regulating chamber, a cutoff diaphragm in said cutoff member connected to said cutoff valve, said cutoff diaphragm having one side exposed to the pressure in said venturi and its opposite side open to atmosphere, said cutoff diaphragm having an effective area exceeding the area of the head member of said cutoff valve, said cutoff valve being biased toward closed position whereby a predetermined pressure drop in said venturi produced by cranking the engine moves said cutoff valve to open position permitting fuel to flow to said venturi under the control of said regulator.

2. A fuel system for a combustion engine having an air intake conduit provided with a flow restriction and a venturi downstream from said flow restriction, a source of fuel under pressure, a regulating system connecting said source to the throat of said venturi, said regulating system including a differential pressure regulator having a regulating chamber adapted to control the flow of fuel from said source, said regulator being referenced to said intake conduit between said restriction and said venturi, a cutoff regulator having a chamber, means connecting the first-named regulator directly to said cutoff regulator, said means having a passageway connecting said regulating chamber with said cutoff chamber, a valve seat in said passageway, a cutoff valve having a stem and a soft resilient disc, one face of said disc adapted to engage said valve seat to isolate said regulating chamber from said cutoff chamber, said one face of said disc being exposed to the pressure in said venturi, the opposite face of said disc being exposed by means of said passageway to the pressure in said regulating chamber, a cutoff diaphragm connected to said cutoff valve, said diaphragm having one side exposed to the pressure in said venturi and its opposite side open to atmosphere, said diaphragm having an effective area exceeding the area of said disc, said cutoff valve being biased toward closed position whereby a predetermined pressure drop in said venturi produced by cranking the engine moves the cutoff valve to open position permitting fuel to flow to said venturi under the control of said regulator.

References Cited in the file of this patent

UNITED STATES PATENTS

| | | |
|---|---|---|
| 1,931,698 | Holzapfel | Oct. 24, 1933 |
| 2,027,492 | Snodgrass | Jan. 14, 1936 |
| 2,223,381 | Mock | Dec. 3, 1940 |
| 2,240,846 | Hanson | May 6, 1941 |
| 2,279,530 | Smith | Apr. 14, 1942 |
| 2,285,905 | Cunningham et al. | June 9, 1942 |
| 2,301,653 | Wells | Nov. 10, 1942 |
| 2,314,580 | Garretson | Mar. 23, 1943 |
| 2,320,969 | Kromer | June 1, 1943 |
| 2,339,988 | Gerson | Jan. 25, 1944 |
| 2,346,763 | Jones | Apr. 18, 1944 |
| 2,377,607 | Bodine | June 5, 1945 |
| 2,475,086 | Ensign | July 5, 1949 |
| 2,498,256 | Dimick | Feb. 21, 1950 |
| 2,563,228 | Ensign | Aug. 7, 1951 |
| 2,601,975 | Hunt | July 1, 1952 |
| 2,698,226 | Perduzzi | Dec. 28, 1954 |